Patented May 29, 1945

2,377,062

UNITED STATES PATENT OFFICE 2,377,062

FORTIFICATION OF GLASS SURFACES

Frederick W. Adams, Pittsburgh, Pa., assignor to Pittsburgh Plate Glass Company, Allegheny County, Pa., a corporation of Pennsylvania No Drawing. Application February 27, 1943, Serial No. 477,446

6 Claims. (Cl. 41—42)

The present invention relates to the treatment of glass surfaces in order to remove certain of the more water-soluble components therefrom and it has particular relation to a process of treating glass surfaces, in order to increase the resistance of the surface to staining and scum formation, due to the action of moisture.

One object of the invention is to provide a simple and highly effective process of removing alkali and alkali earth metal oxides and similarly relatively soluble components of glass from a thin film in the surface in such manner as to provide a surface layer which is very rich in silica and therefore highly resistant to formation of stain due to the hydrolyzing action of films of moisture on the glass.

This and other objects of the invention will be apparent from consideration of the following specification and the appended claims.

It is well known that ordinary glass, such as window glass, comprises an intimate association, possibly a solid solution of an acidic oxide, such as silica and base metal oxides, such as the oxides of alkali and alkaline earth metals. The base metal oxides even in glass are more or less soluble in water, so that glass surfaces exposed to moisture are subjected to a leaching action that tends to dissolve out these more soluble components. The action is especially pronounced if the exposure to moisture is intermittent in character. Glass so exposed in time may become coated with a highly objectionable film of stain that cannot be removed except by polishing with an abrasive agent.

In accordance with the provisions of the present invention it is proposed to obviate or at least to reduce the tendency of ordinary glass to stain by first subjecting the glass to moisture in order superficially to leach out the base metal oxides, then to subject the glass to an acid wash to remove the film leached out and thus to provide a clear, bright surface.

In the practice of the invention the glass, e. g., a sheet of plate glass or ordinary window glass, containing as its main components silica, lime and soda and perhaps other components, such as barium, lead or the like, is exposed to hydrolysis with water. This may conveniently be effected by introducing the glass, e: g., glass sheets in spaced relation into a chamber which is charged to a high degree with water vapor. Ordinary air having a relative humidity of above 80% may conveniently be employed. However, humidity should not be so high as to produce condensation upon the glass surfaces. A humidity of 90 to 98% is a good working average. The glass is maintained in the chamber at about 50° C. until a visible scum or film is formed. This usually will require from about 1 to 3 days, though the period may be increased slightly or extended somewhat in certain instances. The temperature may be increased substantially, e. g., to 80° C., in which case the time of treatment in the humid atmosphere can be reduced.

It is to be recognized that the scum initially formed can usually be removed by scrubbing or washing, but if exposure to moisture is too prolonged the film becomes so pronounced that it cannot be removed, except by polishing the glass with abrasive. It is preferred to stop the treatment of the glass in a humid atmosphere at a stage somewhat short of the formation of permanent stain.

The glass with the film on it is removed and then treated with muriatic acid of a concentration of about 15%. Sulfuric acid or nitric acid of equivalent acidity may be substituted for muriatic acid, if so desired. The treatment is continued until the film is no longer visible. The glass may then be rinsed with pure water and dried. Its resistance to staining or other chemical action may be further increased by subjecting it to baking at a temperature of 100° C. to 300° C. for 5 to 15 minutes. The glass sheets when so treated are of high brilliancy, but are exceedingly resistant to the formation of scum and stain by the action of moisture or other chemical agencies. Invention is applicable to sheet glass, plate glass and other forms of glass in which staining is likely to occur.

The forms of the invention herein disclosed are to be considered merely as exemplary. It will be apparent to those skilled in the art that numerous modifications may be made therein without departure from the spirit of the invention or the scope of the appended claims.

What I claim is:

1. A process of fortifying surfaces of glass consisting of silica and base metal oxides, which process comprises exposing the glass to an atmosphere near the point of saturation in water, the glass being at a temperature above the dew point of the atmosphere, for a period of one to three days to form a scum upon the glass surface, then treating the surface with dilute mineral acid to remove the scum and restore the polish of the surface.

2. A process of fortifying surfaces of glass bodies comprising silica and base metal oxides, which process comprises exposing the glass to an atmosphere containing moisture nearly to the point of saturation and at a temperature above the dew point, for a period of about three days to form a light scum upon the surfaces, then treating the surfaces with dilute mineral acid until the scum has disappeared and the polish of the surface is restored, then baking the glass at a temperature of about 100° C.

3. A process of fortifying surfaces of massive glass bodies comprising silica and base metal oxides, which process comprises exposing the surfaces to an atmosphere laden with moisture nearly to the point of saturation and at a temperature above the dew point until a light scum is formed, then treating the surface with dilute mineral acid until the scum has disappeared and the polish of the surface is restored.

4. A process of fortifying surfaces of glass comprising silica and base metal oxides, which process comprises exposing the glass to an atmosphere above about 80% saturated with moisture and at a temperature above the dew point for a period sufficient to form a light scum, but which can be removed by washing, then treating the surfaces with a dilute mineral acid in order to eliminate the scum and restore the polish.

5. A process of fortifying surfaces of glass plates comprising silica and base metal oxides, which process comprises exposing the glass to an atmosphere of at least approximately 80% saturation with moisture at a temperature above 50° C. and above the dew point until a visible scum is formed, then subjecting the surface to washing with a dilute mineral acid to eliminate the scum and restore the polish.

6. A process of fortifying surfaces of glass sheets comprising silica and base metal oxides, which process comprises exposing the glass to an atmosphere of 90 to 98% saturated with moisture and at a temperature above 50° C. and above the dew point, until a visible film is formed, then treating the surface with a dilute acid to remove the scum and restore the polish and subsequently baking the sheets to harden the surface.

FREDERICK W. ADAMS.